US 6,834,217 B2

(12) United States Patent
Erban

(10) Patent No.: US 6,834,217 B2
(45) Date of Patent: Dec. 21, 2004

(54) METHOD AND DEVICE FOR DETERMINING A SPEED VARIABLE OF AT LEAST ONE DRIVEN WHEEL OF A MOTOR VEHICLE

(75) Inventor: Andreas Erban, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 09/913,005

(22) PCT Filed: Dec. 8, 2000

(86) PCT No.: PCT/EP00/12365

§ 371 (c)(1),
(2), (4) Date: Mar. 13, 2002

(87) PCT Pub. No.: WO01/42067

PCT Pub. Date: Jun. 14, 2001

(65) Prior Publication Data

US 2003/0167116 A1 Sep. 4, 2003

(30) Foreign Application Priority Data

Dec. 8, 1999 (DE) .......................................... 199 59 018

(51) Int. Cl.[7] ................................................ G05D 1/00
(52) U.S. Cl. ............................ 701/1; 477/110; 180/197; 701/51
(58) Field of Search ................................ 701/1, 93, 96, 701/51; 180/233, 197, 247; 477/110, 111, 34

(56) References Cited

U.S. PATENT DOCUMENTS

| 4,804,059 | A | * | 2/1989 | Sakakiyama ................. 180/197 |
| 4,984,161 | A | * | 1/1991 | Nakazawa et al. ............ 701/55 |
| 5,119,299 | A | * | 6/1992 | Tamura et al. ................. 701/85 |
| 5,159,990 | A | * | 11/1992 | Abe et al. ..................... 180/197 |
| 5,562,569 | A | * | 10/1996 | Franzke et al. ............. 477/110 |
| 5,941,923 | A | * | 8/1999 | Fischer et al. ................. 701/53 |
| 6,073,740 | A | * | 6/2000 | Zeller et al. ................ 192/3.31 |
| 6,123,164 | A | * | 9/2000 | Hrovat ........................ 180/197 |
| 6,193,628 | B1 | * | 2/2001 | Hrovat et al. .................. 477/3 |
| 6,205,386 | B1 | * | 3/2001 | Stroh et al. .................... 701/51 |
| 6,385,526 | B1 | * | 5/2002 | Krueger ....................... 701/84 |
| 6,470,253 | B1 | * | 10/2002 | Salecker et al. .............. 701/67 |
| 6,505,139 | B1 | * | 1/2003 | Koga et al. ................... 702/148 |

FOREIGN PATENT DOCUMENTS

| DE | 196 10 864 | 9/1997 |
| DE | 197 26 743 | 1/1999 |
| EP | 0 654 622 | 5/1995 |
| JP | 08 318836 | 12/1996 |

OTHER PUBLICATIONS

Patent Abstracts of Japan, vol. 1997, No. 4, Apr. 30, 1997.
"FDR—*Die Fahrdynamikregelung von Bosch*" [VDC—The Vehicle Dynamics Control of Bosch] appearing in the Automobiltechnischen Zeitschrift (ATZ) 96, 1994, issue 11, on pp. 674 through 689.

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method and a device for determining a variable describing the speed at least one driven wheel of a motor vehicle. In this context, variables describing the respective wheel speeds for the remaining driven wheels of the motor vehicle, and a variable describing the output rpm of a transmission of the motor vehicle are determined. To be able to make a reliable variable describing the speed magnitude of the wheel available to a traction control system or a vehicle-dynamics control system of a motor vehicle in spite of the failure of a speed sensor arranged at one of the wheels, the variable describing the speed for the at least one driven wheel is determined as a function of the variables describing the respective wheel speeds of the remaining driven wheels and as a function of the variable describing the transmission output rpm.

34 Claims, 2 Drawing Sheets

METHOD AND DEVICE FOR DETERMINING A SPEED VARIABLE OF AT LEAST ONE DRIVEN WHEEL OF A MOTOR VEHICLE

FIELD OF THE INVENTION

The present invention relates to a method and a device for determining a variable describing the speed of at least one driven wheel of a motor vehicle, for ascertaining variables describing the respective wheel speeds for the remaining driven wheels of the motor vehicle, and for determining a variable describing the output rpm of a transmission of the motor vehicle. The present invention also relates to a control unit for a traction control system or a in vehicle-dynamics control system of a motor vehicle. To control the drive slip and/or the vehicle dynamics, the control unit determines a variable describing the speed of at least one driven wheel of the motor vehicle. Variables describing the respective wheel speeds for the remaining driven wheels of the motor vehicle, and a variable describing the output rpm of a transmission of the motor vehicle are available to the control unit. The present invention also relates to a memory element for a control unit of a traction control system or a vehicle-dynamics control system of a motor vehicle. The memory element may be a read-only memory, a random-access memory or a flash memory. Stored in the memory element is a computer program that is executable on a computing element, including a microprocessor. Finally, the present invention also relates to a computer program that is executable on a computing element, including a microprocessor.

BACKGROUND INFORMATION

It is believed that various methods and devices for determining a speed variable of at least one driven wheel of a motor vehicle are available.

Thus, for example, German Published Patent Application No. 196 108 64 discusses a method and a device for determining a wheel speed. In that case, the rotational speed of at least one of two wheels of an axle is determined. To that end, a first variable representing the average rotational speed of the two wheels, and a second variable representing the vehicular speed are ascertained. The wheel speed is determined as a function of a comparison of a threshold value and of the difference between a value derived from the first variable and a value derived from the second variable. Upon falling below the threshold value, the rotational motion of the one wheel is determined at zero, and upon exceeding the threshold value, the rotational motion is determined at a value different from zero.

It is believed, however, that ascertaining the wheel speed as above may have the disadvantage that a variable describing the vehicular may be speed is necessary. To be able to determine a precise wheel speed, it is believed that a precise determination of the vehicular speed may be required. This may demand either very accurate estimation methods for determining the vehicular speed, for example, on the basis of the wheel speeds, or else special sensors for detecting the wheel speeds, which, however, may require too much effort and therefore may be costly. If the vehicular speed is determined as a function of the wheel speeds, only wheel speeds are available as initial quantities, based on which the rotational speed of at least one of two wheels of an axle is determined. Because of this, a systematic error may develop, since a further variable which is independent of the wheel speeds may not go into the determination of the rotational speeds.

In German Published Patent Application No. 197 26 743 is discussed a method and a device for automatically determining a differential ratio between a transmission of a motor vehicle and the wheels. In that case, a variable describing the speed of at least one wheel, and the output rpm of the transmission are determined. Furthermore, a driving-state variable describing the driving state of the motor vehicle is ascertained. If an essentially steady driving state exists, the variable describing the differential ratio is determined as a function of the variable describing the wheel speed, and the output rpm of the transmission.

An object of an exemplary embodiment and/or exemplary method of the present invention is to ascertain a variable describing the wheel speed of at least one driven wheel of a motor vehicle. In particular, it is believed that the foregoing provides for making a reliable variable describing the speed magnitude of the wheel available to a traction control system or a vehicle-dynamics control system of a motor vehicle, in spite of the failure of a speed sensor arranged at one of the wheels.

In particular, for the at least one driven wheel, the variable describing the speed may be determined as a function of the variables describing the respective wheel speeds of the remaining driven wheels, and as a function of the variable describing the transmission output rpm.

SUMMARY OF THE INVENTION

The driven wheels of a motor vehicle may be fixedly coupled via a differential to the output end of a transmission, including for front-wheel drive (FWD) and for rear-wheel drive (RWD). In the case of all-wheel drive (AWD), there may be such a fixed coupling only when no slip-encumbered components, such as a viscous coupling, are integrated into this part of the drive train. This fixed coupling exists in the case of all-wheel-drive vehicles with open differentials.

The variable describing the speed of at least one driven wheel may be determined according to the exemplary method of the present invention, given a fixed coupling of the driven wheels to the output end of the transmission. To that end, the known variables describing the respective wheel speeds of the remaining driven wheels are used. In addition, the variable describing the transmission output rpm is used. These variables are available in a control unit for the transmission, for a traction control system or for a vehicle-dynamics control system, and do not have to be determined separately.

The transmission output rpm is ascertainable with low expenditure and high accuracy. The determination is carried out, for example, by a speed sensor mounted at a suitable location on the transmission.

The exemplary method of the present invention can be used to check the performance reliability of wheel-speed sensors of the motor vehicle. For that purpose, the speed variable can be determined in succession for all wheels of the motor vehicle according to the exemplary method of the present invention and compared to the speed variable detected by the wheel-speed sensor to be checked.

Using the exemplary method of the present invention, a corresponding or comparable quantity can be formed for a wheel speed or wheel rotational speed not directly available. For example, a directly determined variable may not be available when a wheel-speed sensor is defective. Thus, using the exemplary method of the present invention, a reliable speed variable of the wheel can be made available in spite of the failure of a wheel-speed sensor. The system availability of a motor vehicle may thereby be increased, particularly in the event of a wheel-speed sensor malfunction. That is to say, the vehicle may continue to be operable in spite of the failure or defect of a wheel-speed sensor. In particular, a reliable quantity describing the speed variable of the wheel can be made available to a traction control system or a vehicle-dynamics control system of a motor vehicle in spite of a malfunction of a wheel-speed sensor. In comparison to previously used traction control systems or vehicle-dynamics control systems, when using the exemplary method of the present invention, it is believed that a system need no longer be switched into the passive state in response to a detected fault in a wheel-speed sensor. The system should continue to be available and fully operative, in spite of such a fault or failure of the wheel-speed sensor.

Such traction control systems or vehicle-dynamics control systems are discussed, for example, in the publication "FDR—Die Fahrdynamikregelung von Bosch" (VDC—The Vehicle Dynamics Control of Bosch) appearing in the Automobiltechnischen Zeitschrift (ATZ) 96, 1994, issue 11, on pp. 674 through 689. The yaw rate of a motor vehicle is controlled using a device discussed in that reference. To control the yaw rate of the vehicle, the measured yaw rate is compared to a setpoint value for the yaw rate. Using this comparison, a system deviation of the yaw rate is determined, as a function of which driver-independent, wheel-individual braking interventions and/or engine interventions are carried out. What may be primarily by the driver-independent, wheel-individual braking interventions, a yaw moment is exerted on the vehicle, by which the actual yaw rate comes closer to the setpoint value. The foregoing vehicle-dynamics control system is also referred to as ESP (Electronic Stability Program). The contents of the publication "FDR—Die Fahrdynamikregelung von Bosch" are incorporated by reference.

In summary, an equivalent (that is, corresponding or comparable) quantity is determined for the speed or the rotational speed of a motor-vehicle wheel having a failed wheel-speed sensor using the sensed rotational speed or speed of the remaining wheels and the output rpm of a transmission. The transmission may be an automatic transmission. However, the exemplary method of the present invention functions just as well with a manually shifted transmission having a manual or an automatic actuation.

According to another exemplary method of the present invention, a variable specific to the wheel plane and describing the output speed is determined as a function of the transmission output rpm. For the at least one driven wheel, the variable describing the speed is determined as a function of the variables describing the respective wheel speeds of the remaining driven wheels, and as a function of the variable describing the output speed.

According to another exemplary embodiment of the present invention, the variable specific to the wheel plane and describing the output speed is determined using the equation of:

$$V_{output} = \frac{\pi}{30} \cdot \frac{R_{wheel}}{I_{Diff}} \cdot n_{output},$$

where $R_{wheel}$ is the radius of the driven wheels and $I_{Diff}$ is the effective differential ratio(s).

For a motor vehicle having all-wheel drive, the variable describing the speed for the at least one driven wheel may be advantageously determined using the equation of:

$$V_{wheelDef} = 4 \cdot V_{output} - \sum_{i=1}^{3} V_{wheeli}.$$

For a motor vehicle having front-wheel drive or rear-wheel drive, the variable describing the speed for the at least one driven wheel may be advantageously determined according to the equation:

$$V_{wheelDef} = 2 \cdot V_{output} - V_{wheeli},$$

where $V_{wheel}$ is the wheel speed of the driven wheel whose wheel speed is not to be determined, that is to say, whose wheel-speed sensor is not defective.

Further, starting from the device indicated at the outset, the exemplary device determines the variable describing the speed for the at least one driven wheel as a function of the variables describing the respective wheel speeds of the remaining driven wheels, and as a function of the variable describing the transmission output rpm.

According to another exemplary embodiment of the present invention, the device includes an apparatus, arrangement or structure for performing the exemplary method according to the present invention.

Further, starting from the control unit indicated at the outset, the exemplary control unit determines the variable describing the speed for the at least one driven wheel as a function of the variables describing the respective wheel speeds of the remaining driven wheels, and as a function of the variable describing the transmission output rpm.

According to another exemplary embodiment of the present invention, the apparatus, arrangement or structure for performing the exemplary method according to the present invention is implemented in the control unit.

The exemplary method according to the present invention may be implemented in the form of a memory element that is provided for a control unit of a traction control system or a vehicle-dynamics control system of a motor vehicle. In this context, a computer program that is executable on a computing element, in particular on a microprocessor, and that is suitable for carrying out or performing the exemplary method according to the present invention, is stored at, in or on the memory element. In this case, therefore, the exemplary embodiment of the present invention is realized by way of a computer program stored at, in or on the memory element, so that this memory element, as provided with the computer program, constitutes the exemplary embodiment of the present invention in the same way as the exemplary method for whose accomplishment the computer program is suitable. In particular, an electrical storage medium, for example, a read-only memory, a random-access memory, or a flash memory, can be used as the memory element.

The exemplary embodiment of the invention also relates to a computer program that is suitable for carrying out the exemplary method according to the present invention when it is executed on a computing element, in particular on a microprocessor. In this context, the computer program may be stored in a memory element, in particular in a flash memory.

DETAILED DESCRIPTION

Figure 1:
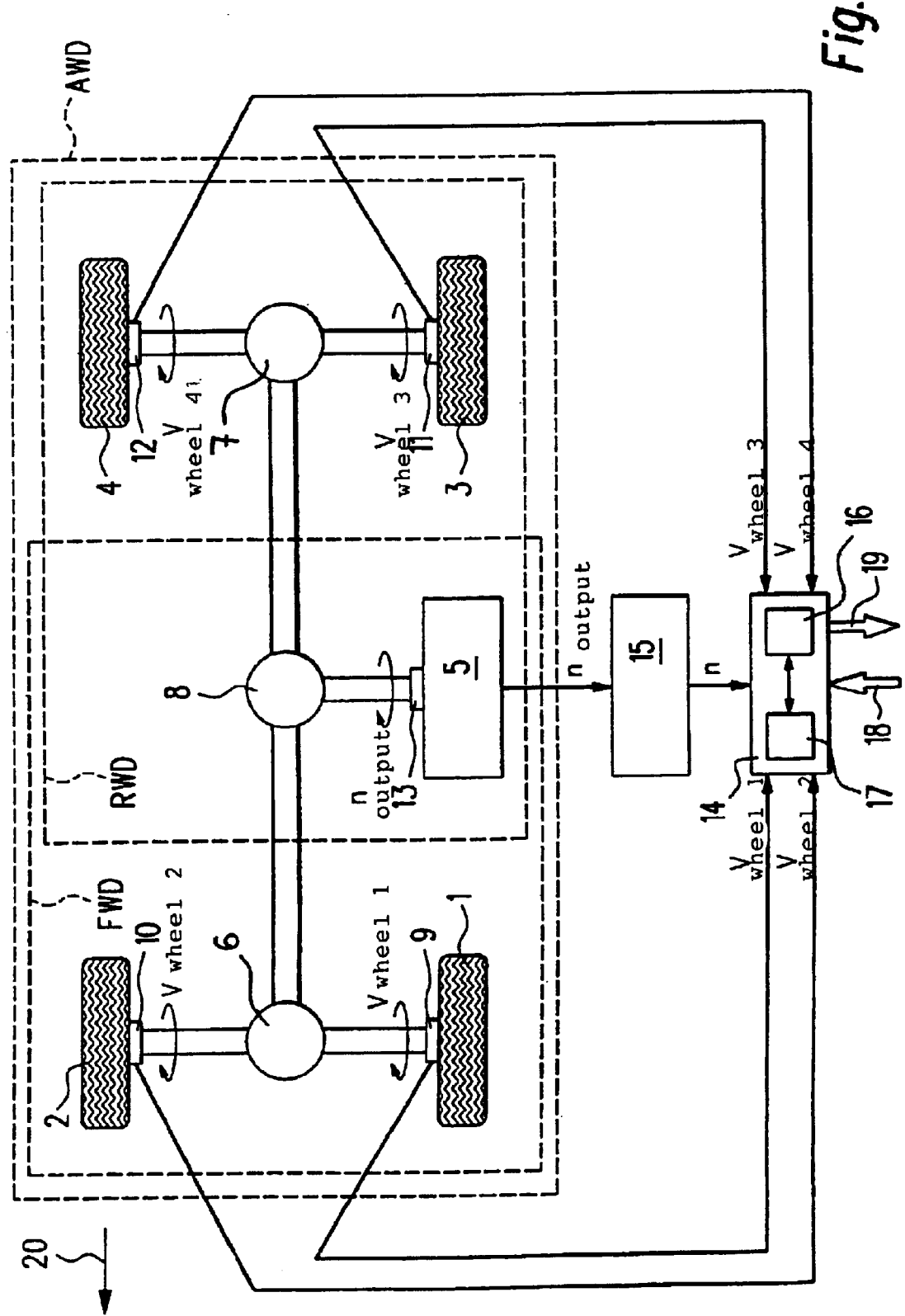
FIG. 1 shows a block diagram of an exemplary device according to the present invention.

FIG. 1 shows a drive train of a motor vehicle having four wheels 1, 2, 3, 4. The direction of travel of the motor vehicle is indicated by an arrow 20. The front wheels (front-wheel drive, FWD), the rear wheels (rear-wheel drive, RWD) or the front and rear wheels (all-wheel drive, AWD) can be driven in the motor vehicle. The driven wheels of the FWD and of the RWD may be fixedly coupled via a differential to the output end of a transmission 5. In the case of AWD, there is a fixed coupling only when no slip-encumbered components, such as a viscous-friction coupling (so-called viscous coupling), are integrated into this part of the drive train. This fixed coupling is provided in all-wheel-drive vehicles with open differentials. As can be seen in FIG. 1, the single-axle-driven motor vehicles, i.e., FWD and RWD motor vehicles, have two differentials 6, 7. All-wheel drive, i.e., AWD vehicles, have three differentials 6, 7, 8.

Both front wheels 1, 2 of the vehicle have wheel speeds $V_{wheel1}$ and $V_{wheel2}$. Both rear wheels have wheels speeds $V_{wheel3}$ and $V_{wheel4}$. The speeds of wheels 1, 2, 3, 4 are determined from rotational speeds $n_{wheel1}$, $n_{wheel2}$, $n_{wheel3}$, $n_{wheel4}$ and from radius $R_{wheel}$ of wheels 1, 2, 3, 4. Instead of radius $R_{wheel}$, it is also possible to use the diameter of wheels 1, 2, 3, 4. Rotational speeds $n_{wheel1}$ $n_{wheel2}$, $n_{wheel3}$ $n_{wheel4}$ of wheels 1, 2, 3, 4 are detected by speed sensors 9, 10, 11, 12 that are arranged in the area of wheels 1, 2, 3, 4. Transmission 5 is an automatic transmission.

Transmission 5 is linked via a controller area network (CAN) bus 15, in part, to a control unit 14 of a vehicle-dynamics control system 14, which is also referred to as ESP (electronic stability program). The design and the functioning method of an ESP is discussed in the publication "FDR—Die Fahrdynamikregelung von Bosch", which is incorporated by reference.

On condition that output rpm $n_{output}$ of automatic transmission 5 is measured by an independent sensor 13 and all driven wheels are coupled in a slip-free manner to the output end of transmission 5, a quantity for a failed speed sensor 9, 10, 11 or 12 can be formed according to the exemplary method of the present invention. A prerequisite for this is that wheel 1, 2, 3 or 4 having the defective speed sensor is a wheel coupled to transmission 5, thus a driven wheel.

To carry out or perform the exemplary method of the present invention, control unit 14 has a memory element 16 and a computing element, particularly a microprocessor 17. For example, memory element 16 may be a flash memory. Stored on memory element 16 is a computer program that is executable on microprocessor 17 and that is suitable for implementing the method of the present invention. To control the operating-dynamics stability of the motor vehicle, control unit 14 is supplied with input variables 18 which also include, in part, wheel speeds $V_{wheel1}$, 1 $V_{wheel2}$, $V_{wheel3}$, $V_{wheel4}$ and output rpm $n_{output}$ of transmission 5. From these input variables 18, control unit 14 determines output quantities 19, for example, for controlling an internal combustion engine, a braking system (particularly an ABS braking system) or a steering system (particularly a steer-by-wire steering system) of the motor vehicle.

In the case of an AWD motor vehicle, the corresponding or comparable (or equivalent) quantity describing speed $V_{wheelDef}$ of a wheel 1, 2, 3 or 4 having a defective wheel-speed sensor 9, 10, 11 or 12 is determined using the equation of:

$$V_{wheelDef} = 4 \cdot V_{output} - \sum_{i=1}^{3} V_{wheeli},$$

where $V_{output}$ is a variable specific to the wheel plane and describing the output speed of transmission 5, which is determined by the equation of:

$$V_{output} = \frac{\pi}{30} \cdot \frac{R_{wheel}}{I_{Diff}} \cdot n_{output},$$

where $V_{wheel1}$ is the rotational speed of the remaining driven wheels whose wheel-speed sensors are in working order. That is, output speed $V_{output}$ is yielded as a function of output rpm $n_{output}$ and a conversion factor for converting revolutions per minute (R/min) into meters per second (m/s). Output speed $V_{output}$ corresponds to the average value of wheel speeds $V_{wheel1}$ of the driven wheels.

In a motor vehicle having front-wheel drive or rear-wheel drive, the corresponding or comparable quantity is determined using the equation of:

$$V_{wheelDef} = 2 \cdot V_{output} - V_{wheel},$$

where $V_{wheel}$ is the wheel speed of the other driven wheel whose wheel-speed sensor is in working order.

Depending on the type of drive of the motor vehicle, effective differential ratio $I_{Diff}$ can be composed of the ratios of differentials 6, 7 and/or 8. In the case of a FWD, it is composed of the two differential ratios $I_{DiffQ}$ of front at differential 6 and $I_{Diffmiddle}$ of middle differential 8, and in the case of a RWD, it is composed of the two differential ratios $I_{DiffQ'}$ of rear differential 7 and $I_{Diffmiddle}$ of middle differential 8. In the case of an AWD, all differential ratios $I_{DiffQ}$, $I_{DiffQ'}$ und $I_{Diffmiddle}$ must be taken into account or combined. In this context, differential ratio $I_{Diff}$ is yielded as the product of the individual differential ratios. Allowance may need to be made for an effective off-road reduction.

If a wheel-speed sensor 9, 10, 11 or 12 is not in working order, the corresponding or comparable (or equivalent) quantity describing the speed of the wheel can be calculated for the wheel having the defective wheel-speed sensor using the exemplary method of the present invention. Thus, a shutdown of a complete vehicle-dynamics control system or a complete traction control system should not be necessary. For example, an ABS function, i.e., a traction control system which is based solely on braking interventions, may be provided up to a specific vehicle speed with a defective wheel-speed sensor 9, 10, 11 or 12. The probability of the failure of the complete vehicle should therefore be markedly reduced. This should hold true in particular for off-road vehicles in which external wheel-speed sensors 9, 10, 11, 12 may be subject to particularly high external stress during off-road travel. The shutdown behavior for the ABS case, i.e., the brake-slip control contained in the vehicle-dynamics control, may also be developed more favorably.

Figure 2:
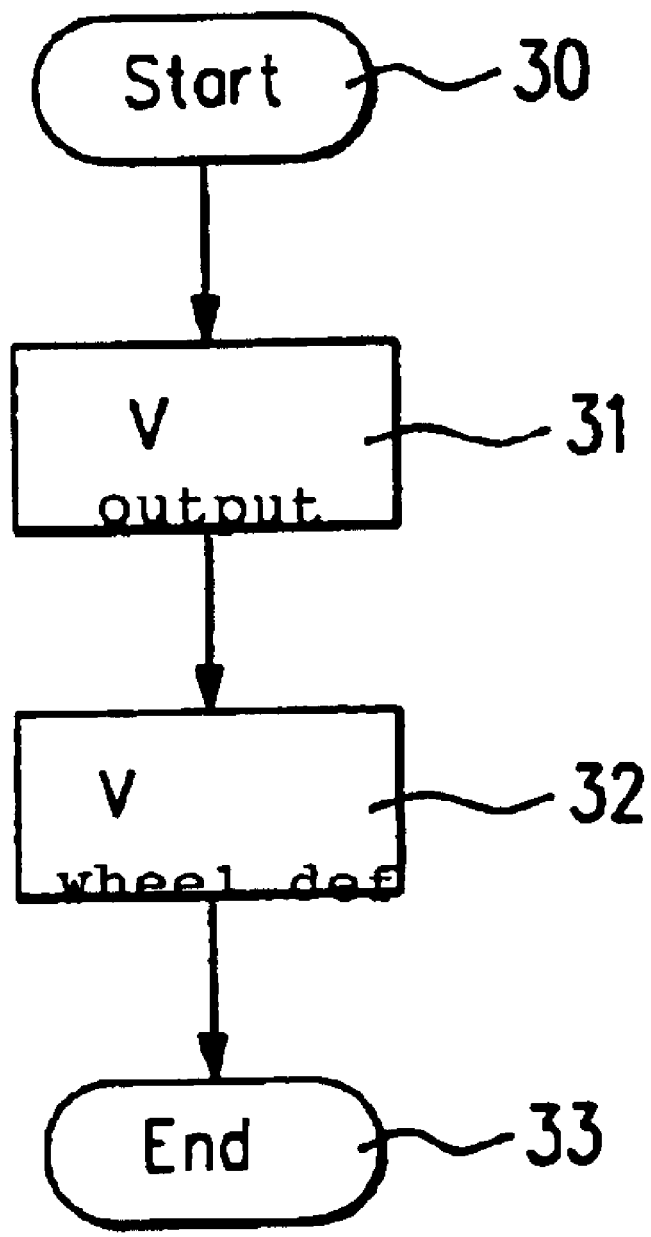
FIG. 2 shows a flow chart of an exemplary method according to the present invention.

FIG. 2 shows a flowchart of the exemplary method according to the present invention. The exemplary method begins in a functional block 30. In the following, it is assumed that the motor vehicle has a front-wheel drive (FWD), and a corresponding or comparable quantity describing the speed of wheel 2 must be determined. To that end, in a functional block 31, a variable specific to the wheel plane and describing output speed $V_{output}$ of transmission 5 is first determined. Output speed variable $V_{output}$ is determined as a function of transmission output rpm $n_{output}$ according to the following equation:

$$V_{output} = \frac{\pi}{30} \cdot \frac{R_{wheel}}{I_{Diff}} \cdot n_{output}.$$

The corresponding or comparable (or equivalent) quantity describing speed $V_{wheelDef} = V_{wheel2}$ of wheel 2 is subsequently determined in a functional block 32 according to the following equation:

$$V_{wheelDef} = 2 \cdot V_{output} - V_{wheel}.$$

In this context, $V_{wheel}$ is the speed of wheel 1 having speed sensor 9 in working order. In a functional block 33, the exemplary method of the present invention is then brought to an end.

Wheel-speed variable $V_{wheelDef}$, determined using the exemplary method according to the present invention, is compared to wheel speed $V_{wheel2}$ detected by speed sensor 10 of wheel 2. If the deviations of the two wheel speeds exceed a specifiable threshold value, a malfunction of speed sensor 10 is assumed. Wheel-speed variable $V_{wheelDef}$ used with the exemplary method of the present invention can also be used as a corresponding or comparable (or equivalent) quantity for wheel speed $V_{wheel2}$ of wheel 2 if speed sensor 10 is defective.

What is claimed is:

1. A method for determining a speed variable describing a speed of at least one driven wheel of a motor vehicle, the method comprising:
   determining variables describing respective wheel speeds of remaining driven wheels of the motor vehicle;
   determining an output rpm variable describing a transmission output rpm of a transmission of the motor vehicle;
   determining the speed variable describing the speed of the at least one driven wheel as a function of the variables describing the respective wheel speeds of the remaining driven wheels, and as a function of the output rpm variable describing the transmission output rpm; and
   determining an output speed variable specific to a wheel plane and describing an output speed as a function of the transmission output rpm;
   wherein the speed variable describing the speed of the at least one driven wheel is determined as a function of the variables describing the respective wheel speeds of the remaining driven wheels, and as a function of the output speed variable describing the output speed.

2. The method of claim 1, wherein the output speed variable specific to the wheel plane and describing the output speed is determined according to the equation of:

$$V_{output} = \frac{\pi}{30} \cdot \frac{R_{wheel}}{I_{Diff}} \cdot n_{output},$$

where $R_{wheel}$ is a radius of the driven wheels and $I_{Diff}$ is at least one effective differential ratio.

3. The method of claim 1, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

4. The method of claim 1, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

5. A device for determining a speed variable describing a speed of at least one driven wheel of a motor vehicle, the device comprising:
   a first arrangement for determining variables describing respective wheel speeds of remaining driven wheels of the motor vehicle;
   a second arrangement for determining an output rpm variable describing a transmission output rpm of a transmission of the motor vehicle; and
   a third arrangement for determining the speed variable describing the speed for the at least one driven wheel as a function of the variables describing the respective wheel speeds of the remaining driven wheels, and as a function of the output rpm variable describing the transmission output rpm;
   wherein:
      the device includes an arrangement for determining an output speed variable specific to a wheel plane and describing an output speed as a function of the transmission output rpm; and
      the speed variable describing the speed of the at least one driven wheel is determined as a function of the variables describing the respective wheel speeds of the remaining driven wheels, and as a function of the output speed variable describing the output speed.

6. The device of claim 5, wherein the output speed variable specific to the wheel plane and describing the output speed is determined according to the equation of:

$$V_{wheelDef} = 4 \cdot V_{output} - \sum_{i=1}^{3} V_{wheeli},$$

where $R_{wheel}$ is a radius of the driven wheels and $I_{Diff}$ is at least one effective differential ratio.

7. The device of claim 5, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

8. The device of claim 5, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

9. A control unit for one of a traction control system and a vehicle-dynamics control system of a motor vehicle for controlling at least one of drive slip and vehicle dynamics, the control unit comprising:
   an arrangement for determining a speed variable describing the speed of at least one driven wheel of the motor vehicle, wherein variables describing respective wheel speeds of remaining driven wheels of the motor vehicle and an output rpm variable describing a transmission output rpm of a transmission of the motor vehicle are available to the control unit;
   wherein the control unit determines the speed variable describing the speed for the at least one driven wheel as a function of the variables describing the respective wheel speeds of the remaining driven wheels and as a function of the output rpm variable describing the transmission output rpm;

wherein:
the control unit includes an arrangement for determining an output speed variable specific to a wheel plane and describing an output speed as a function of the transmission output rpm; and
the speed variable describing the speed of the at least one driven wheel is determined as a function of the variables describing the respective wheel speeds of the remaining driven wheels, and as a function of the output speed variable describing the output speed.

10. The control unit of claim 9, wherein the output speed variable specific to the wheel plane and describing the output speed is determined according to the equation of:

$$V_{output} = \frac{\pi}{30} \cdot \frac{R_{wheel}}{I_{Diff}} \cdot n_{output},$$

where $R_{wheel}$ is a radius of the driven wheels and $I_{Diff}$ is at least one effective differential ratio.

11. The control unit of claim 9, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

12. The control unit of claim 9, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

13. A memory element comprising:
at least one of a read-only memory, a random-access memory and a flash memory for use in a control unit of one of a traction control system and a vehicle-dynamics control system of a motor vehicle;
wherein the memory element stores a computer program that is executable on at least one of a computing element and a microprocessor for performing a process for determining a speed variable describing a speed of at least one driven wheel of a motor vehicle, the process including:
determining variables describing respective wheel speeds of remaining driven wheels of the motor vehicle;
determining an output rpm variable describing a transmission output rpm of a transmission of the motor vehicle; and
determining the speed variable describing the speed of the at least one driven wheel as a function of the variables describing the respective wheel speeds of the remaining driven wheels, and as a function of the output rpm variable describing the transmission output rpm;
wherein:
the process includes determining and output speed variable specific to a wheel plane and describing an output speed as a function of the transmission output rpm; and
the speed variable describing the speed of the at least one driven wheel is determined as a function of the variables describing the respective wheel speeds of the remaining driven wheels, and as a function of the output speed variable describing the output speed.

14. The memory element of claim 13, wherein the output speed variable specific to the wheel plane and describing the output speed is determined according to the equation of:

$$V_{output} = \frac{\pi}{30} \cdot \frac{R_{wheel}}{I_{Diff}} \cdot n_{output},$$

where $R_{wheel}$ is a radius of the driven wheels and $I_{Diff}$ is at least one effective differential ratio.

15. The memory element of claim 13, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

16. The memory element of claim 13, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

17. A computer program for execution on at least one of a computing element and a microprocessor, wherein the computer program is operable to perform a process for determining a speed variable describing a speed of at least one driven wheel of a motor vehicle, the process including:
determining variables describing respective wheel speeds of remaining driven wheels of the motor vehicle;
determining an output rpm variable describing a transmission output rpm of a transmission of the motor vehicle; and
determining the speed variable describing the speed of the at least one driven wheel as a function of the variables describing the respective wheel speeds of the remaining driven wheels, and as a function of the output rpm variable describing the transmission output rpm;
wherein:
the process includes determining an output speed variable specific to a wheel plane and describing an output speed as a function of the transmission output rpm; and
the speed variable describing the speed of the at least one driven wheel is determined as a function of the variables describing the respective wheel speeds of the remaining driven wheels, and as a function of the output speed variable describing the output speed.

18. The computer program of claim 17, wherein the output speed variable specific to the wheel plane and describing the output speed is determined according to the equation of:

$$V_{output} = \frac{\pi}{30} \cdot \frac{R_{wheel}}{I_{Diff}} \cdot n_{output},$$

where $R_{wheel}$ is a radius of the driven wheels and $I_{Diff}$ is at least one effective differential ratio.

19. The computer program of claim 17, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

20. The computer program of claim 17, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

21. The computer program of claim 17, wherein the computer program is stored at at least one of a memory element and a flash memory.

22. The method of claim 2, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

23. The method of claim 2, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

24. The device of claim 6, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

25. The device of claim 6, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

26. The control unit of claim 10, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

27. The control unit of claim 10, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

28. The memory element of claim 14, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

29. The memory element of claim 14, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

30. The computer program of claim 18, wherein the motor vehicle has all-wheel drive, and the speed variable describing the speed of the at least one driven wheel is determined according to the equation of:

$$V_{wheelDef} = 4 \cdot V_{output} - \sum_{i=1}^{3} V_{wheeli}.$$

31. The computer program of claim 18, wherein the motor vehicle has one of front-wheel drive and rear-wheel drive, and the speed variable describing the speed for the at least one driven wheel is determined according to the equation of:

$$V_{wheelDef} = 2 \cdot V_{output} - V_{wheel},$$

where $V_{wheel}$ is a wheel speed of another driven wheel.

32. The computer program of claim 18, wherein the computer program is stored at at least one of a memory element and a flash memory.

33. The computer program of claim 19, wherein the computer program is stored at at least one of a memory element and a flash memory.

34. The computer program of claim 20, wherein the computer program is stored at at least one of a memory element and a flash memory.

* * * * *

UNITED STATES PATENT AND TRADEMARK OFFICE
CERTIFICATE OF CORRECTION

PATENT NO.   : 6,834,217 B2
DATED        : December 21, 2004
INVENTOR(S)  : Andreas Erban It is certified that error appears in the above-identified patent and that said Letters Patent is hereby corrected as shown below:

Column 5,
Line 48, change "$V_{wheeli}{}^{1}$" to -- $V_{wheeli}$ --

Column 8,
Line 33, change " $V_{wheelDef} = 4 \cdot V_{output} - \sum_{i=1}^{3} V_{wheeli}$ ,"

To
-- $V_{output} = \frac{\pi}{30} \cdot \frac{R_{wheel}}{I_{Diff}} \cdot n_{output}$ ,--

Column 9,
Line 62, change "and output speed" to -- an output speed --

Signed and Sealed this

Twenty-sixth Day of July, 2005

JON W. DUDAS
*Director of the United States Patent and Trademark Office*